7327X
D. Steinhauer.
Grate.
Patented Dec. 13. 1832.
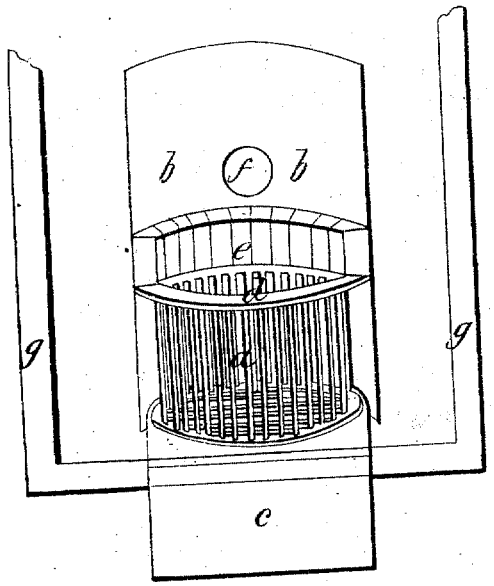
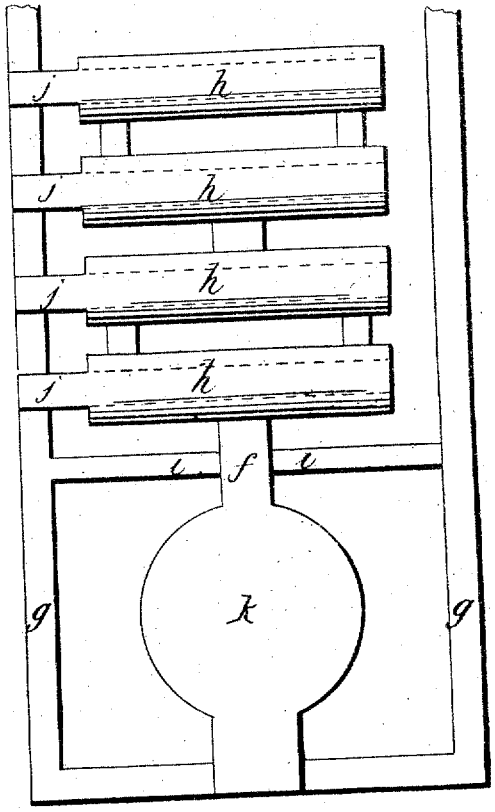

7327x Dec 13, 1832

Daniel Steinhauer. A Resident in the United States

Letters Patent.

The Schedule referred to in these Letters Patent, and making
part of the same, containing a description in the words of the said
Daniel Steinhauer, himself of his improvement in the abstraction of
heat from the smoke of air-heaters, & in the mode of applying Basket
Grates to such heaters.

In meditating on the best plan, in an economical point
of view of heating houses by warm air & from actual experiments
made upon the subject, I have satisfied myself fully, that by far
the most durable of all fireplaces is a Basket Grate for the fire when
suspended in a cylinder or airheater of large diameter, in such a way
that the bottom of the grate and the bottom of the cylinder form the top
of the ash pit; allowing the air thence to play freely in the space between
the grate & the cylinder, round the fire, yet checking its ascent in
that space beyond the top of the grate, by a ring or flange, closing
said space effectually at such height, whence a single range of fire
Bricks may conveniently be applied for the protection of the
cylinder in the immediate vicinity of the fire; while the rush of
air below said ring or flange will sufficiently cool the sides and bottom
of the basket grate, to prevent their being injured by the heat of the fire, though
the air may attain such a temperature as will maintain the radia-
ting glow of the fuel facing the lower part of the cylinder, aiding
at the same time the combustion, instead of ascending unobstructed
at a lower temperature to the injury of the heat evolved above.

I have in the same way fully satisfied myself that the
violent combustion, brought about in air furnaces by high chimneys,
is by no means necessary for the limited object of heating air to a
moderate temperature. Dispensing therefore in such cases with
high chimneys & carrying the smoke or gas from the fireplace in
an an horizontal direction, by the original impulse from the combus-
tion, kept up by a continuation of its operation. I find that the
heat of the smoke or gases may be abstracted to any desirable
extent by a system of double cased cylindrical smoke drums
placed sideways in succession as gas retorts, inclosed in a
walled air chamber, the one drum receiving the smoke from
the other & each having a separate draft of cold air from without
rushing thro' the interior, while a draft from below is provided
for taking up the heat from the exterior of the drums, which
various currents of variously heated air will mix together above
& form a medium temperature, either by themselves, if the air
chamber containing them be entirely separate, or with the
air heated by the main body of the Stove. If the separation be
made by a lower partition only, the whole to be distributed thence
in the house by pipes or flues from the air chamber. But tho' the
entire heat of the smoke may in this way be rendered available
yet local circumstances, & more particularly the height of the
chimney by which the smoke is to escape, must necessarily be
taken into consideration in determining the extent to which it
may be advisable, & even practicable to carry the saving of heat
above alluded to. I thus claim as my invention for the
heating of houses by warm air, the abstraction of heat to any
desirable extent, from the smoke of air heaters, by a system of
double cased cylindrical drums, placed horizontally and in suc-
cession as gas retorts inclosed in a walled air chamber, either
entirely separate from the air chamber of the main body of the
air heater, or forming part of it by a partition only, not carried
higher than the drums, each drum having a separate cold air
flue thro' its centre & a separate or common draft from below
to strike the outer casing of each, so as to produce a separate
rush of air thro' & from around each drum, differently heated
of course, according to the different temperature of the smoke
in the respective drums, but mixing above into one body
of a of a medium temperature for further distribution in the house
by pipes or flues from the air chamber. And with regard to
the fire place itself. I claim as my invention the particular
application of a basket grate, in suspending it in a cylinder or
air heater of larger diameter so as to allow the air to play freely
in the space between the grate and the cylinder round the fire,
yet checking its ascent in that space beyond the top of the grate,
by a ring or flange, closing said space effectually at such
height. Exd. W.H.

D. Steinhauer

Witnesses
F. Newman
B. L. Carnfres